Figure 4:
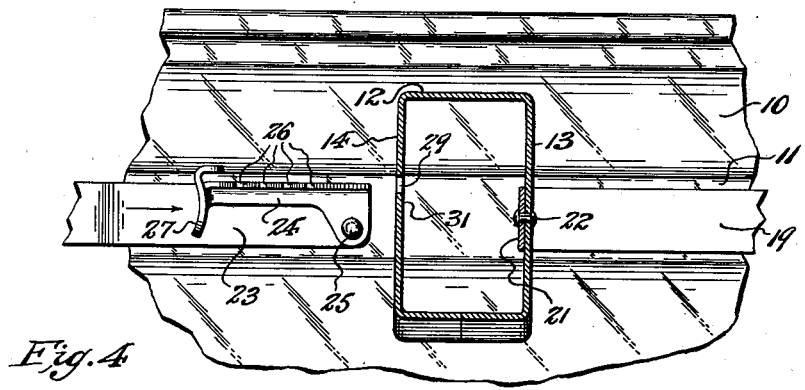

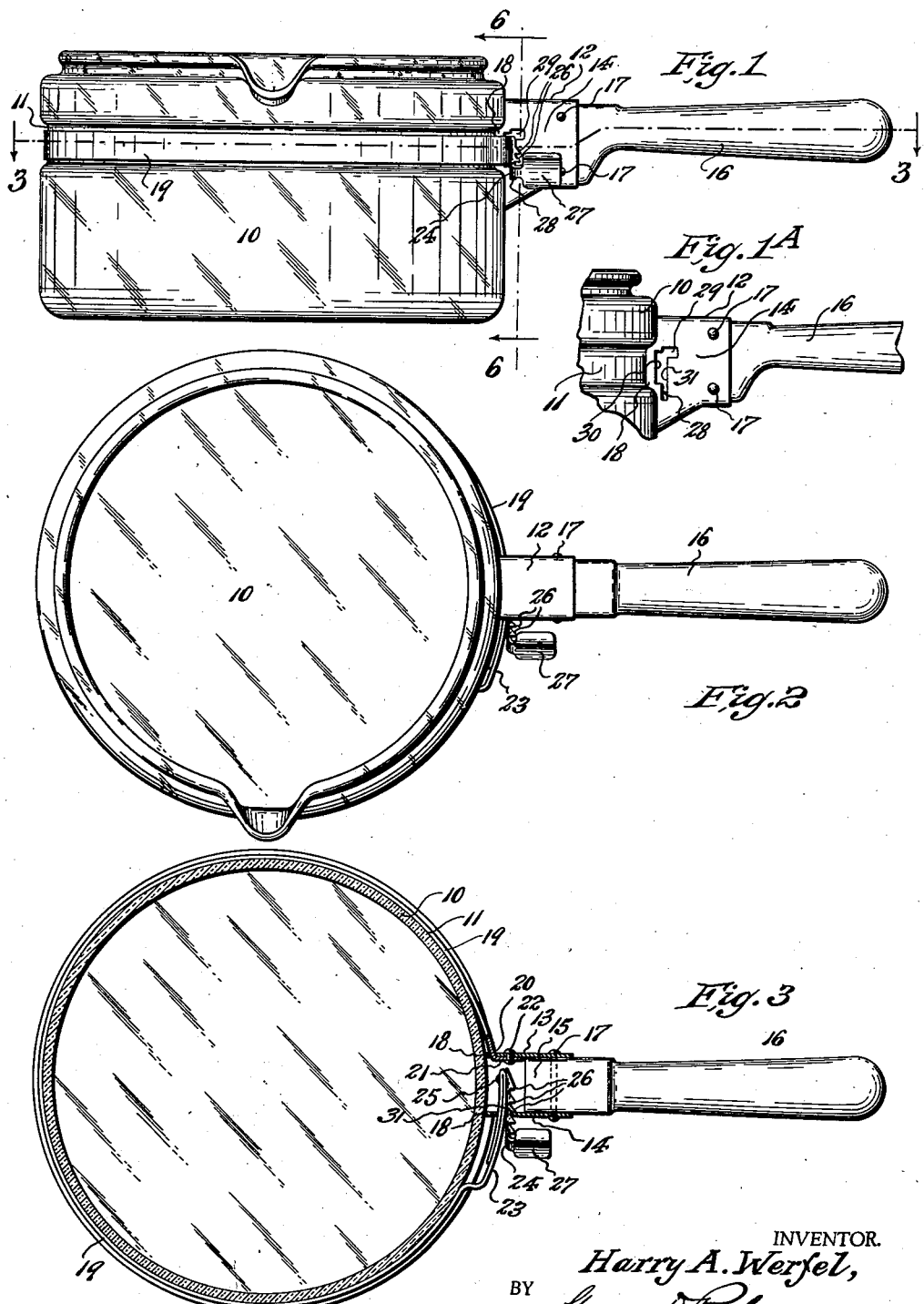

INVENTOR.
Harry A. Werfel,
BY George D. Richards,
ATTORNEY.

Patented Mar. 10, 1942

2,275,875

UNITED STATES PATENT OFFICE 2,275,875

DETACHABLE HANDLE FOR UTENSILS

Harry A. Werfel, Essex Fells, N. J., assignor to Jennings Silver Company, Irvington, N. J., a corporation of New Jersey Application April 15, 1941, Serial No. 388,595

8 Claims. (Cl. 16—114)

This invention relates to improvements in detachable handle means for cooking and other utensils; and the invention has reference, more particularly, to a detachable handle structure especially adapted for application to utensils made of glass, porcelain and other vitreous materials.

Glass cooking utensils at the present time are becoming increasingly popular, since types of glass able to withstand high heat have been well developed. It has not been found practical however to provide glass utensils, designed for cooking, with integral handles, since the same are subject to the risk of being easily broken off, and, consequently, it has been found desirable to provide the bodies of such utensils with handle means capable of being mechanically attached thereto. It has also been found desirable to provide such mechanically attached handle structures in forms which will permit detachment thereof from the utensil body, whereby not only to facilitate cleansing of the utensil after use, but also to permit the utensil to be employed for service of the food cooked therein at the table.

Having these things in mind, it is an object of this invention to provide an easily and quickly manipulatable detachable handle means for utensils which include self-contained releasable means to encircle and grip the body of the utensil to which it is applied, so as to firmly embrace and supportingly carry the latter, but in such manner as to avoid setting-up undue stresses or strains in the utensil body.

Another object of this invention is to provide a detachable handle for utensils including a discontinuous clamp band provided with self-contained manipulatable means for locking the same in closed embracing and gripping relation to the utensil to be served by the handle. A more specific object of this invention is to provide a novel construction of detachable handle means for utensils comprising, supporting means for the handle together with a discontinuous clamp band having one end anchored to said handle supporting means, the free end of said clamp band having self-contained manipulatable means for not only releasably coupling the same to the handle supporting means to close the clamp band in embracing relation to the utensil body to which it is applied, but also so as to tighten said clamp band into immovable, frictionally bound gripping relation to said utensil body.

Other objects of this invention, not at this time more particularly enumerated, will be understood from the following detailed description of the same.

An illustrative embodiment of this invention is shown in the accompanying drawings, in which:

Fig. 1 is a side elevational view showing a utensil in the form of a glass sauce-pan equipped with the novel detachable handle means of this invention; Fig. 1A is a fragmentary side view of the slotted abutment member of the handle means; Fig. 2 is a plan view of the detachable handle equipped utensil; and Fig. 3 is a horizontal sectional view of the same, taken partially on line 3—3 in Fig. 1.

Figure 5:
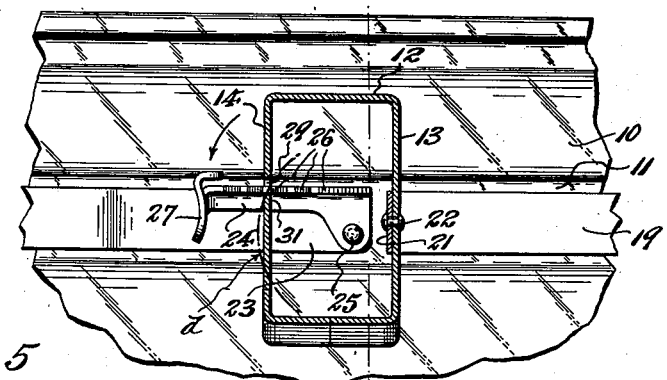
Figure 6:
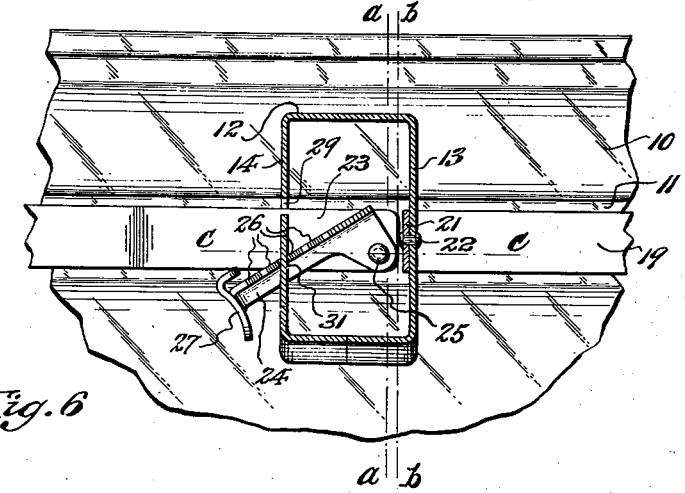

Figs. 4, 5 and 6 are enlarged fragmentary sectional views, taken on line 6—6 in Fig. 1, respectively showing the several stages of manipulative operations employed in applying and locking the novel detachable handle means in operative assembled relation to the utensil body.

Similar characters of reference are employed in the above described views, to indicate corresponding parts.

In said drawings, the reference character 10 indicates a utensil body, illustratively shown in the form of a sauce-pan made of glass, although it will be understood that the utensil may be of any other body form, and may be made of vitreous or any other material. The novel detachable handle means according to this invention is, however, especially adapted for use with utensils made of glass or like vitreous material.

Preferably the utensil body 10 is formed with an externally disposed annular channel 11, suitably located intermediate its top and bottom, whereby to receive the body embracing part of the detachable handle structure desired to be applied thereto.

The novel detachable handle structure, in an illustrative embodiment thereof as shown in the accompanying drawings, comprises a hollow abutment member 12 having spaced side walls 13 and 14. Said abutment member 12 may be made of any suitable material, but is preferably made of sheet metal, and is suitably formed at its outer end portion to receive and support the butt portion 15 of a suitably shaped handle member 16 which is adapted to extend exteriorly therefrom. Illustrative of one method of mounting the handle member in connection with said abutment member 12, as shown, the latter is provided with an outer open end into which the butt portion 15 of the handle member 16 is inserted, and then suitably secured rigidly thereto, as, for example, by transverse fastening rivets 17 passed through the outer end portion of said abutment member and the butt portion 15 of said handle member assembled therewith. The inner extremity of said abutment member 12 is shaped to conform to the surface contours of the utensil body 10 to which it is applied, and when said utensil body 10 is provided with the annular channel 11 above mentioned, the side walls 13 and 14 of said abutment member are preferably provided with projecting ears 18 adapted to enter said channel 11, and thus hold the abutment member, when operatively applied to the utensil body 10, against perpendicular shift or displacement relative to the latter.

Anchored to said abutment member, for extension therefrom, is one end of a discontinuous clamp band 19. A preferred method of so anchoring said clamp band is to provide one side wall of the abutment member 12, e. g. the side wall 13, with a slot 20 through which an end portion of the clamp band 19 may be passed; the inwardly projecting end portion of the clamp band 19 being angularly turned to lie against the inner face of said side wall, thus providing an angular anchor lug 21 adapted to be fixedly secured to said side wall, as by a fastening rivet 22 as shown, or in any other suitable manner, such e. g. as by welding the anchor lug to said abutment side wall.

The clamp band, as thus affixed by one end of the abutment member 12, forms a loop having a free end portion 23, whereby the band may be opened or expanded to facilitate engaging the same over and into encircling and embracing relation to the utensil body 10. Means is provided to not only couple said free end portion 23 of the clamp band to the abutment member 12, whereby to close the clamp band around the utensil body 10, but also to both constrict the clamp band into tightened frictionally bound, non-slipping engagement with the utensil body, as well as to lock said free end portion 23 against accidental release from such coupled relation to the abutment member 12. To this end, the free end portion 23 of the clamp band 19 is provided with a combined stretching and lock lever 24 pivotally mounted thereon adjacent to the extremity of said free end portion 23, by means of a pivotal connection 25, and so that said lever extends rearwardly therefrom along and contiguous to the outer face of said clamp band. Said lever 24 is provided along a longitudinal margin thereof, preferably the upper margin, with an angularly and outwardly projecting flange, the free edge of which is provided with a plurality of longitudinally spaced serrations or teeth 26. Said lever 24 terminates at its free end in a suitably shaped finger-piece 27 by means of which the same may be manipulated. The pivotal connection 25 of said lever is offset relative to the serrated or toothed flange, and is also preferably somewhat offset relative to the central longitudinal axis of the clamp band, whereby, when the lever is upswung to normal initial position, (see Figs. 4 and 5), said serrated or toothed flange lies contiguous to and substantially parallel to the upper edge of said clamp band.

Formed in the opposite side wall of the abutment member 12, i. e. the side wall 14, is a perpendicular slot suitably shaped to permit insertion, through said wall, of the free end portion 23 of the clamp band 19, together with the lever 24 carried thereby, when the latter is disposed in normal initial upswung position. This slot therefore, in preferred form, comprises a perpendicular main portion 28, to pass the main body of said lever 24, said main portion 28 terminating at its upper end in a lateral enlargement 29 to pass the serrated or toothed flange 26, and having at its inner side an offset enlargement 30 to pass the clamp band per se. Said main portion 28 of said slot corresponds in width to the thickness of the lever 24, being sufficiently in excess thereof to permit free sliding and swinging movement thereof. The outer marginal portion 31 of said main portion 28 of the slot provides a thrust shoulder adapted to be engaged by a selected serration or tooth 26 of the lever flange, when said lever is downswung in the functional operation thereof as hereinafter described.

To apply the detachable handle structure to the utensil body 10, the free end portion 23 of the clamp band 19 being disconnected from the abutment member 12, and the stretching and lock lever 24 being upswung to normal initial position, as shown in Fig. 4, said clamp band is expanded so as to pass down over the utensil body 10, and into alignment with the channel 11 with which the latter is provided. At the same time the abutment member 12 is caused to abut the exterior side of the utensil body 10 at a desired point, with the ears 18 thereof entered in the channel 11 of the latter (see Fig. 1A). With the parts in this position, the free end portion 23 of the clamp band, together with the upswung lever 24, is inserted through the slot 28—29—30, and pushed directly into the interior of the abutment member 12, as far as the operator can press it by ordinary finger pressure (see Fig. 5). This operation enters the clamp band in the channel 11, and closes the same around the utensil body, but not tightly enough to assure against slippage of the clamp band relative to the utensil body. This operation will bring the inserted free end portion 23 of the clamp band up e. g. to the line $a$—$a$ (see Fig. 5), and will bring a serration or tooth 26 of the lever 24 within the limits of and opposed to the thrust shoulder 31 provided by the outer marginal portions of the slot 28.

When the parts are disposed in the above described positions, the operator swings down the lever 24, thereby bringing the adjacent serration or tooth 26 into engagement with the thrust shoulder 31 provided by the outer marginal portions of the slot 28. Continued downward swing of the lever 24 about its pivotal connection 25, causes the engaging serration or tooth 26, as it rides downwardly along the thrust shoulder 31 while traversing the arcuate path $d$ about the lever fulcrum (see Fig. 5), to be inwardly thrust by said thrust shoulder 31, thereby transmitting, through the lever 24, to the free end portion 23 of the clamp band 19, an additional inward movement operative to carry the clamp band end from e. g. the line $a$—$a$ to the line $b$—$b$ (see Fig. 6). It will be obvious that such further inward movement of the clamp band end operates to tightly constrict the band into close hugging and taut frictionally bound relation to and about the utensil body 10, whereby the same is tightened into non-slipping relation to the latter. This final tightening or constrictive movement of the clamp band 19, while sufficient to effect a close hugging frictional non-slipping bond between said clamp band and the utensil body, is not great enough, owing to the comparatively shallow arc of movement of the operative tooth 26 about the lever fulcrum, to effect an overtightening of the clamp band likely to produce undue pressure so as to set up undue stresses or strains in the utensil body with risk of fracturing the latter.

In the above described manipulation of the lever 24, its downswinging movement is continued until the thrust shoulder engaging serration or tooth thereof crosses slightly beyond the dead center line c—c of lever swing about the pivotal connection 25 (see Fig. 6), whereby the elastic reaction of the clamp band would tend to continue rather than reverse downswinging movement of said lever 24, and consequently the latter thereupon functions to lock the entered free end portion 23 of the clamp band against accidental release, as will be apparent from an inspection of Fig. 6.

While I have described an arrangement of the stretching and lock lever 24 wherein its operative movement is in a downward direction, it will be obvious that the arrangement of the lever and disposition of the slot 28—29—30 could be reversed so that the operative swinging movement of said lever would be in an upward direction, should such be more convenient or otherwise desirable.

To detach the handle structure from the utensil body 10, it is merely necessary to swing upward the lever 24 past dead center and back to normal initial position, whereupon the elastic reaction inherent in the tightened clamp band 19 will cause the free end thereof to withdraw out of the abutment member 12, so as to be released therefrom, so that the clamp band may be expanded for removal from the utensil body.

From the above description it will be clear that a very convenient, efficient and easily manipulated detachable handle structure for various kinds of utensils is provided by the instant invention, which, when operatively attached to the utensil, is firmly and securely bound thereto in a manner eliminating all looseness, and, therefore, so as to offer firm support for the utensil when the latter is lifted and carried about by the attached handle means; furthermore, the novel means for releasably securing the handle structure in operative attached relation to a utensil body is self-contained, and avoids all necessity for use of separable fastener elements which involve risk of loosening, accidental release, and possible loss.

It will be understood that various changes could be made in the above described constructions, and that other and widely different embodiments of this invention could be made without departing from the scope thereof as defined in the following claims. It is therefore intended that all matter contained in the foregoing description or shown in the accompanying drawings shall be interpreted as illustrative and not in a limiting sense.

I claim:

1. A detachable handle for utensils comprising, a handle structure adapted to abut a utensil body in extending relation therefrom, a clamp band having one end anchored to said handle structure and the other end free, a stretching lever pivotally mounted on the free end portion of said clamp band to swing in a plane parallel to the face plane of the latter, said handle structure having means to receive said clamp band free end portion and lever mounted thereon including a perforate wall angular to the face plane of said clamp band end portion, and means angularly projecting from said lever adapted to be engaged with said wall whereby, when said lever is swung about its pivotal connection while in engagement with said wall, the same will be caused to exert an inward thrust upon the clamp band free end portion effective to constrict the clamp band around the utensil body and into frictional gripping relation thereto.

2. A detachable handle for utensils comprising, a handle structure adapted to abut a utensil body in extending relation therefrom, a clamp band having one end anchored to said handle structure and the other end free, a stretching and lock lever pivotally mounted on the free end portion of said clamp band to swing in a plane parallel to the face plane of the latter, said handle structure having means to receive said clamp band free end portion and lever mounted thereon including a perforate wall angular to the face plane of said clamp band end portion, and means angularly projecting from said lever adapted to be engaged with said wall whereby, when said lever is swung about its pivotal connection while in engagement with said wall, the same will be caused to exert an inward thrust upon the clamp band free end portion effective to constrict the clamp band around the utensil body and into frictional gripping relation thereto, said lever, when swung past dead center position of its thrusting swing, being adapted to occupy a position in engagement with said wall effective to lock said inserted clamp band end portion against accidental withdrawal.

3. A detachable handle means for utensils comprising, a hollow abutment member to abut the utensil body and having a handle member affixed to its outer end portion for extension therefrom, a clamp band having one end anchored to one side wall of said abutment member and the other end free, a stretching lever pivotally mounted on the free end portion of said clamp band to swing in a plane parallel to the face plane of the latter, the other side wall of said abutment member extending in a plane angular to the face plane of said clamp band end portion and having a slot adapted to admit insertion therethrough of said clamp band free end portion and lever mounted thereon, and projections on said lever adapted to be selectively engaged with said slotted wall of said abutment member when said lever is inserted therethrough and manipulated, whereby said lever is caused to exert an inward thrust upon the inserted free end portion of said clamp band effective to constrict the clamp band around the utensil body and into frictional gripping relation thereto.

4. A detachable handle means for utensils comprising, a hollow abutment member to abut the utensil body and having a handle member affixed to its outer end portion for extension therefrom, a clamp band having one end anchored to one side wall of said abutment member and the other end free, a stretching lever pivotally mounted on the free end portion of said clamp band to swing in a plane parallel to the face plane of the latter, the other side wall of said abutment member extending in a plane angular to the face plane of said clamp band end portion and having a slot adapted to admit insertion therethrough of said clamp band free end portion and lever mounted thereon, and projections on said lever adapted to be selectively engaged with said slotted wall of said abutment member when said lever is inserted therethrough and manipulated, whereby said lever is caused to exert an inward thrust upon the inserted free end portion of said clamp band effective to constrict the clamp band around the utensil body and into frictional gripping relation thereto, said lever, when swung past dead center position of its pivotal movement, being adapted to occupy a position in engagement with said slotted wall of the abutment member effective to lock said inserted clamp band end portion against accidental withdrawal.

5. A detachable handle means for utensils as defined in claim 3, wherein said abutment member is provided with an inner extremity shaped to substantially correspond to surface contours of the utensil with which it is engaged.

6. A detachable handle means for utensils as defined in claim 3, wherein the means on said lever engageable with said slotted wall of said abutment member comprises a plurality of selectively usable laterally projecting longitudinally spaced teeth.

7. A detachable handle means for utensils comprising, a hollow abutment member to engage the utensil body and having a handle member affixed to its outer end portion for extension therefrom, a clamp band having one end anchored to one side wall of said abutment member and the other end free, a stretching lever having a row of selectively usable laterally projecting longitudinally spaced teeth, means to pivotally connect said lever to the free end portion of said clamp band so as to dispose the same in rearward extension from the extremity of the latter and for swinging movement in a plane parallel to the face thereof, said pivotal connection being offset relative to said row of teeth, and the other side wall of said abutment member having a slot adapted to admit insertion therethrough of said clamp band free end portion and lever mounted thereon, whereby, when said lever is engaged therethrough and swung about its pivotal connection, a selected tooth thereof may engage and thrust against the slotted wall of said abutment member so as to constrict the clamp band around the utensil body and into frictional gripping relation thereto.

8. A detachable handle means for utensils comprising, a hollow abutment member to engage the utensil body and having a handle member affixed to its outer end portion for extension therefrom, a clamp band having one end anchored to one side wall of said abutment member and the other end free, a stretching lever having a row of selectively usable laterally projecting longitudinally spaced teeth, means to pivotally connect said lever to the free end portion of said clamp band so as to dispose the same in rearward extension from the extremity of the latter and for swinging movement in a plane parallel to the face thereof, said pivotal connection being offset relative to said row of teeth, and the other side wall of said abutment member having a slot adapted to admit insertion therethrough of said clamp band free end portion and lever mounted thereon, whereby, when said lever is engaged therethrough and swung about its pivotal connection, a selected tooth thereof may engage and thrust against the slotted wall of said abutment member so as to constrict the clamp band around the utensil body and into frictional gripping relation thereto, said lever, when swung past dead center position of its pivotal movement, being adapted to occupy a position in engagement with said slotted wall of the abutment member effective to lock said inserted clamp band end portion against accidental withdrawal.

HARRY A. WERFEL.